(12) United States Patent
Martin

(10) Patent No.: US 8,199,342 B2
(45) Date of Patent: Jun. 12, 2012

(54) TAILORING IMAGE DATA PACKETS TO PROPERTIES OF PRINT HEADS

(75) Inventor: Robert Martin, Sunnyvale, CA (US)

(73) Assignee: FUJIFILM Dimatix, Inc., Lebanon, NH (US)

( * ) Notice: Subject to any disclaimer, the term of this patent is extended or adjusted under 35 U.S.C. 154(b) by 1201 days.

(21) Appl. No.: 10/977,298

(22) Filed: Oct. 29, 2004

(65) Prior Publication Data

US 2006/0092437 A1    May 4, 2006

(51) Int. Cl.
*G06F 3/12* (2006.01)
*G06K 15/00* (2006.01)

(52) U.S. Cl. .................. 358/1.15; 358/1.8

(58) Field of Classification Search .......... 358/1.15, 358/1.14, 1.13, 1.16, 1.17, 1.18, 1.1, 1.8, 358/1.6, 1.9, 1.2, 1.3, 1.4, 1.5, 1.7, 1.11, 358/400, 401, 405, 407, 468; 347/1, 2, 3, 347/5, 14, 23, 117; 399/1, 2, 8; 710/15, 710/8, 10, 11, 62, 64, 72; 709/220, 221; 713/1, 100

See application file for complete search history.

(56) References Cited

U.S. PATENT DOCUMENTS

| | | |
|---|---|---|
| 4,486,739 A | 12/1984 | Franaszek et al. |
| 4,563,689 A | 1/1986 | Murakami et al. |
| 5,138,333 A | 8/1992 | Bartky et al. |
| 5,150,048 A | 9/1992 | McAuliffe et al. |
| 5,359,350 A | 10/1994 | Nakano et al. |
| 5,361,084 A | 11/1994 | Paton et al. |
| 5,361,420 A | 11/1994 | Dobbs et al. |
| 5,369,420 A | 11/1994 | Bartky |
| 5,408,590 A | 4/1995 | Dvorzsak |
| 5,438,350 A | 8/1995 | Kerry |
| 5,463,414 A | 10/1995 | Temple et al. |
| 5,463,416 A | 10/1995 | Paton et al. |
| 5,512,796 A | 4/1996 | Paton |
| 5,512,922 A | 4/1996 | Paton |
| 5,521,619 A | 5/1996 | Suzuki et al. |
| 5,604,711 A | 2/1997 | Cheung |
| 5,604,771 A | 2/1997 | Quiros |
| 5,631,675 A | 5/1997 | Futagawa |
| 5,663,217 A | 9/1997 | Kruse |

(Continued)

FOREIGN PATENT DOCUMENTS

CN        1410780        4/2003

(Continued)

OTHER PUBLICATIONS

U.S. Appl. No. 10/966,022, filed Oct. 15, 2004, Gardner.

(Continued)

*Primary Examiner* — Dov Popovici

(74) *Attorney, Agent, or Firm* — Fish & Richardson P.C.

(57) ABSTRACT

Techniques, systems, and computer program products that facilitate tailoring image data packets to properties of print heads in a printing system. Control software in the printing system remote from the print head(s) may send a query to a print head over a control channel and receive a reply include information characterizing parameters of the print head, e.g., specific configuration information or a part number. The control software may use the information characterizing the properties of the print head to look up specification details of the layout of print elements in the print head and use that information to configure image data packet generating components in the control software for the particular print head layout.

30 Claims, 5 Drawing Sheets

U.S. PATENT DOCUMENTS

| | | |
|---|---|---|
| 5,668,579 A | 9/1997 | Fujii et al. |
| 5,731,048 A | 3/1998 | Ashe et al. |
| 5,779,837 A | 7/1998 | Harvey |
| 5,784,062 A | 7/1998 | Adachi et al. |
| 5,784,171 A | 7/1998 | Kano |
| 5,790,139 A | 8/1998 | Umeno et al. |
| 5,825,375 A | 10/1998 | Droit et al. |
| 5,837,046 A | 11/1998 | Schofield et al. |
| 5,842,258 A | 12/1998 | Harvey et al. |
| 5,843,219 A | 12/1998 | Griffin et al. |
| 5,854,886 A | 12/1998 | MacMillan et al. |
| 5,855,713 A | 1/1999 | Harvey |
| 5,903,754 A | 5/1999 | Pearson |
| 5,910,372 A | 6/1999 | Griffin et al. |
| 5,941,951 A | 8/1999 | Day et al. |
| 5,959,643 A | 9/1999 | Temple et al. |
| 5,975,672 A | 11/1999 | Wen |
| 5,984,448 A | 11/1999 | Yanagawa |
| 5,984,464 A | 11/1999 | Steinfield et al. |
| 5,997,124 A | 12/1999 | Capps et al. |
| 6,010,202 A | 1/2000 | Arnott |
| 6,014,153 A | 1/2000 | Harvey |
| 6,033,055 A | 3/2000 | Nagoshi et al. |
| RE36,667 E | 4/2000 | Michaelis et al. |
| 6,046,822 A | 4/2000 | Wen et al. |
| 6,088,050 A | 7/2000 | Ng |
| 6,089,698 A | 7/2000 | Temple et al. |
| 6,092,886 A | 7/2000 | Hosono |
| 6,102,513 A | 8/2000 | Wen |
| 6,106,092 A | 8/2000 | Norigoe et al. |
| 6,123,405 A | 9/2000 | Temple et al. |
| 6,193,343 B1 | 2/2001 | Norigoe et al. |
| 6,217,141 B1 | 4/2001 | Nakamura et al. |
| 6,228,311 B1 | 5/2001 | Temple et al. |
| 6,232,135 B1 | 5/2001 | Ashe et al. |
| 6,257,689 B1 | 7/2001 | Yonekubo |
| 6,260,951 B1 | 7/2001 | Harvey et al. |
| 6,270,179 B1 | 8/2001 | Nou |
| 6,276,772 B1 | 8/2001 | Sakata et al. |
| 6,281,913 B1 | 8/2001 | Webb |
| 6,286,943 B1 | 9/2001 | Ashe et al. |
| 6,295,077 B1 | 9/2001 | Suzuki |
| 6,312,076 B1 | 11/2001 | Taki et al. |
| 6,328,395 B1 | 12/2001 | Kitahara et al. |
| 6,331,040 B1 | 12/2001 | Yonekubo et al. |
| 6,331,045 B1 | 12/2001 | Harvey et al. |
| 6,339,480 B1 | 1/2002 | Yamada et al. |
| 6,352,328 B1 | 3/2002 | Wen et al. |
| 6,379,440 B1 | 4/2002 | Tatum et al. |
| 6,384,930 B1 | 5/2002 | Ando |
| 6,399,402 B2 | 6/2002 | Ashe et al. |
| 6,402,278 B1 | 6/2002 | Temple |
| 6,402,282 B1 | 6/2002 | Webb |
| 6,412,924 B1 | 7/2002 | Ashe et al. |
| 6,422,690 B1 | 7/2002 | Harvey et al. |
| 6,437,879 B1 | 8/2002 | Temple |
| 6,460,991 B1 | 10/2002 | Temple et al. |
| 6,467,863 B1 | 10/2002 | Imanaka et al. |
| 6,468,779 B1 | 10/2002 | Red'kina |
| 6,471,315 B1 | 10/2002 | Kurata |
| 6,476,096 B1 | 11/2002 | Molloy et al. |
| 6,505,918 B1 | 1/2003 | Condie et al. |
| 6,517,195 B1 | 2/2003 | Koeda |
| 6,565,191 B1 | 5/2003 | Bolash et al. |
| 6,568,779 B1 | 5/2003 | Pulman et al. |
| 6,572,221 B1 | 6/2003 | Harvey et al. |
| 6,652,068 B2 | 11/2003 | Hsu et al. |
| 6,666,537 B1 | 12/2003 | Kelley et al. |
| 6,685,297 B2 | 2/2004 | Butterfield et al. |
| 6,752,482 B2 | 6/2004 | Fukano et al. |
| 6,764,154 B2 | 7/2004 | Nishikori et al. |
| 6,882,711 B1 | 4/2005 | Nicol |
| 7,076,724 B2 | 7/2006 | Cole et al. |
| 7,234,788 B2 | 6/2007 | Gardner |
| 7,234,799 B2 | 6/2007 | Gardner |
| 7,436,540 B2 | 10/2008 | Okamoto et al. |
| 2002/0033644 A1 | 3/2002 | Takamura |
| 2002/0186393 A1 | 12/2002 | Pochuev et al. |
| 2003/0081227 A1 | 5/2003 | Williams et al. |
| 2003/0160836 A1 | 8/2003 | Fukano et al. |
| 2004/0000560 A1 | 1/2004 | Henry et al. |
| 2004/0028830 A1 | 2/2004 | Bauer |
| 2004/0070791 A1 | 4/2004 | Pattusamy et al. |
| 2004/0113959 A1 | 6/2004 | Tamura |
| 2005/0018940 A1 | 1/2005 | Obayashi |
| 2005/0041073 A1 | 2/2005 | Fontaine et al. |
| 2005/0195229 A1 | 9/2005 | Barss |
| 2005/0270329 A1 | 12/2005 | Hoisington et al. |
| 2006/0050099 A1 | 3/2006 | Murakami et al. |
| 2006/0066701 A1 | 3/2006 | Hirakawa |
| 2006/0082797 A1 | 4/2006 | Gardner |
| 2006/0082811 A1 | 4/2006 | Gardner et al. |
| 2006/0082812 A1 | 4/2006 | Gardner |
| 2006/0082813 A1 | 4/2006 | Martin et al. |
| 2006/0082814 A1 | 4/2006 | Gardner |
| 2006/0087523 A1 | 4/2006 | Horsnell et al. |
| 2006/0092201 A1 | 5/2006 | Gardner |
| 2006/0098036 A1 | 5/2006 | Gardner |
| 2007/0206038 A1 | 9/2007 | Baker |
| 2007/0236535 A1 | 10/2007 | Baker et al. |
| 2008/0158279 A1 | 7/2008 | Barss |

FOREIGN PATENT DOCUMENTS

| | | |
|---|---|---|
| CN | 101040505 | 9/2007 |
| CN | 101052942 A | 10/2007 |
| CN | 101052943 | 10/2007 |
| CN | 101052974 | 10/2007 |
| CN | 101091153 A | 12/2007 |
| CN | 101189622 | 5/2008 |
| EP | 0 375 147 | 6/1990 |
| EP | 0 600 707 | 6/1994 |
| EP | 0 810 097 | 12/1997 |
| EP | 0 876 915 | 11/1998 |
| EP | 0 919 382 | 6/1999 |
| EP | 0 964 339 | 12/1999 |
| EP | 1 212 201 | 6/2002 |
| EP | 1212201 | 6/2002 |
| EP | 1212201 A0 | 6/2002 |
| EP | 1 267 254 | 12/2002 |
| EP | 1293341 A2 * | 3/2003 |
| EP | 1452313 A1 | 9/2004 |
| EP | 0 827 838 | 3/2005 |
| JP | 58055253 | 4/1983 |
| JP | 03065069 | 3/1991 |
| JP | 4273081 | 9/1992 |
| JP | H06-113143 | 4/1994 |
| JP | H09-058019 | 3/1997 |
| JP | H09-102861 | 4/1997 |
| JP | 09-231035 | 9/1997 |
| JP | 10336413 | 12/1998 |
| JP | H11-58891 | 3/1999 |
| JP | 2000-6389 | 1/2000 |
| JP | 2000141829 | 5/2000 |
| JP | 2000246862 | 9/2000 |
| JP | 2000255019 | 9/2000 |
| JP | 2000326560 | 11/2000 |
| JP | 2001-01570 | 1/2001 |
| JP | 2001010035 | 1/2001 |
| JP | 2001-334706 | 12/2001 |
| JP | 2002512766 | 4/2002 |
| JP | 2002-171257 | 6/2002 |
| JP | 2002-292935 | 10/2002 |
| JP | 2002540701 | 11/2002 |
| JP | 2003-001879 | 1/2003 |
| JP | 2003500899 | 1/2003 |
| JP | 2003244391 | 8/2003 |
| JP | 2004-94586 | 3/2004 |
| JP | 2004221629 | 8/2004 |
| JP | 2004-268511 | 9/2004 |
| JP | 2004-276394 | 10/2004 |
| JP | 08-516801 | 5/2008 |
| JP | 08-517379 | 5/2008 |
| JP | 2008-516802 | 5/2008 |
| JP | 2008-516803 | 5/2008 |
| JP | 2008-517380 | 5/2008 |
| JP | 2008-517811 | 5/2008 |
| KR | 2007-0062532 | 6/2007 |

| | | |
|---|---|---|
| KR | 2007-0062549 | 6/2007 |
| KR | 2007-0065348 | 6/2007 |
| KR | 2007-0065383 | 6/2007 |
| KR | 2007-0065384 | 6/2007 |
| KR | 2007-0095277 | 9/2007 |
| WO | 99/52253 | 10/1999 |
| WO | 00/58842 | 10/2000 |
| WO | 00/70827 | 11/2000 |
| WO | WO 01/12444 | 2/2001 |
| WO | WO 01/13328 | 2/2001 |
| WO | 03/094502 | 11/2003 |
| WO | WO 2004/000560 | 12/2003 |
| WO | WO 2005/018940 | 3/2005 |
| WO | WO 2006/044530 | 4/2006 |
| WO | WO 2006/044587 | 4/2006 |
| WO | WO 2006/044597 | 4/2006 |
| WO | WO 2006/044598 | 4/2006 |
| WO | WO 2006/044599 | 4/2006 |
| WO | WO 2006/049836 | 5/2006 |
| WO | WO 2006/052466 | 5/2006 |
| WO | WO 2006/052885 | 5/2006 |

OTHER PUBLICATIONS

U.S. Appl. No. 10/966,205, filed Oct. 15, 2004, Gardner.
U.S. Appl. No. 10/966,024, filed Oct. 15, 2004, Martin et al.
U.S. Appl. No. 10/966,019, filed Oct. 15, 2004, Gardner et al.
U.S. Appl. No. 10/977,023, filed Oct. 15, 2004, Gardner et al.
8B/10B-encoding scheme. (8 pages) [Online], [retrieved on Sep. 3, 2008]. Retrieved from the Internet: <URL:http://en.wikipedia.org/wiki/8B/10B_encoding>.
Fibre Channel Protocol. (7 pages). [Online], [retrieved on Sep. 7, 2008]. Retrieved from the Internet: <URL:http://en.wikipedia.org/wiki/Fibre_Channel_Protocol>.
IEEE 802.3 Standard. (4 pages)[Online], [retrieved on Sep. 6, 2008]. Retrieved from the Internet: <URL:http://en.wikipedia.org/wiki/IEEE802.3>.
David A. Johns et al., "Analog Integrated Circuit Design", John Wiley & Sons, Inc., 1997. pp. 39-42, 396-397 and 398-400. Published in U.S.A. and Canada.
Fibre Channel—Physical and Signaling Interface (FC-PH), American National Standards Institute, ANSI X3.230-1994.
International Preliminary Report on Patentability for Application No. PCT/US2005/036934, dated Apr. 26, 2007 (171WO1).
Chinese Office Action dated Aug. 22, 2008 issued in CN200580043211.2 (170CN1).
Chinese Office Action dated Aug. 14, 2009 issued in CN200580035204.8 (171CN1).
Chinese Office action dated Mar. 13, 2009 issued in 200580035215.6 (167CN1).
Chinese Office Action dated Jun. 6, 2008 issued in 2005800375139 (181CN1).
European Office Action issued on Mar. 24, 2009 in EP 05807759.5 (171EP1).
European Office Action issued on Aug. 10, 2009 in EP 05810801.0 (181EP1).
Chinese Office Action dated Sep. 25, 2009 issued in 2005800432127 (169CN1).
Chinese Office Action dated Sep. 4, 2009 issued in 200580043211.2, 11 pages (170CN1).
Office Action issued in U.S. Appl. No. 10/966,019 dated May 1, 2009 (168OO1).
Office Action issued in U.S. Appl. No. 10/966,024 dated Aug. 7, 2009 (171OO1).
Office Action issued in U.S. Appl. No. 10/966,205 dated Jul. 29, 2009 (169OO1).
Chinese Office Action dated Sep. 25, 2009 for CN Patent Application No. 2005800352211, pp. 1-20.
U.S. Appl. No. 10/966,023, filed Oct. 15, 2004, Pending.
U.S. Appl. No. 10/966,019, filed Oct. 15, 2004, Pending.
U.S. Appl. No. 10/966,205, filed Oct. 15, 2004, Pending.
Office Action dated May 1, 2009 issued in U.S. Appl. No. 10/966,019 16 pgs.
Chinese Office Action dated Sep. 25, 2009 issued in CN200580035221.1.
Chinese Office Action dated Sep. 25, 2009 issued in CN2005800432127.
8B/10B-encoding scheme. (8pgs.) [Online], [retrieved on Sep. 3, 2008]. Retrieved from the internet: <URL:http://en.wikipedia.org/wiki/8B/10B_encoding>.
Sachs, "Fibre Channel and Related Standards", IEEE Communications Magazine, IEEE Service Center, vol. 34, Aug. 1996, pp. 40-50.
Japanese Office Action dated Aug. 10, 2010 issued in JP 2007-536879, 3 pages. (-0167JP1).
Japanese Office Action dated Aug. 17, 2010 issued in JP 2007-536913, 2 pages (-0171JP1).
Japanese Office Action dated Jul. 13, 2010 issued in 2007-536905, 3 pages (-168JP1).
European Office Action dated Jun. 8, 2010 issued in 05 807 451.9, 6 pgs. (-0170EP1).
Office Action dated Oct. 12, 2010 received in co-pending Japanese Application 2007-538968, 2 pgs.
Machine Translation of Japanese Patent No. JP-10-336413 available from Patent Abstracts of Japan, http://www4.ipdl.inpit.go.jp/Tokujitu/tjsogodben.ipdl?N0000=115, 12 pgs.
Machine Translation of Japanese Patent No. JP 2000-141829 available from Patent Abstracts of Japan, http://www4.ipdl.inpit.go.jp/Tokujitu/tjsogodben.ipdl?N0000=115, 10 pgs.
Machine Translation of Japanese Patent No. JP-2003-500899 available from Patent Abstracts of Japan, http://www4.ipdl.inpit.go.jp/Tokujitu/tjsogodben.ipdl?N0000=115, 17 pgs.
Machine Translation of Japanese Patent No. JP-2004-221629 available from Patent Abstracts of Japan, http://www4.ipdl.inpit.go.jp/Tokujitu/tjsogodben.ipdl?N0000=115, 25 pgs.
Machine Translation of Japanese Patent No. JP-2001-001570 available from Patent Abstracts of Japan, http://www4.ipdl.inpit.go.jp/Tokujitu/tjsogodben.ipdl?N0000=115, 18 pgs.
Machine Translation of Japanese Patent No. JP-2004-094586 available from Patent Abstracts of Japan, http://www4.ipdl.inpit.go.jp/Tokujitu/tjsogodben.ipdl?N0000=115, 11 pgs.
Machine Translation of Japanese Patent No. JP-2003-244391, available from Patent Abstracts of Japan, http://www4.ipdl.inpit.go.jp/Tokujitu/tjsogodben.ipdl?N0000=115, 14 pgs.
Machine Translation of Japanese Patent No. JP2000-255019 available from Patent Abstracts of Japan, http://www4.ipdl.inpit.go.jp/Tokujitu/tjsogodben.ipdl?N0000=115, 10 pgs.
Machine Translation of Japanese Patent No. JP2000-326560, available from Patent Abstracts of Japan, http://www4.ipdl.inpit.go.jp/Tokujitu/tjsogodben.ipdl?N0000=115, 18 pgs.
Machine Translation of Japanese Patent No. JP2000-246862, available from Patent Abstracts of Japan, http://www4.ipdl.inpit.go.jp/Tokujitu/tjsogodben.ipdl?N0000=115, 8 pgs.
Office Action dated Feb. 3, 2011 issued in European Application No. 05810626.1, 4 pgs. (167EP1 Feb. 3, 2011).
Uncertified English translation of Office Action dated Oct. 12, 2010 issued in Japanese Application No. 2007-538968, 5 pgs.
Office action issued Mar. 15, 2011 in Japanese Application No. 2007-536915, 21 pgs., and uncertified translation thereof. (169JP1).
Office action issued Apr. 6, 2011 in European Application No. 05809003.6, 4 pgs. (169EP1.
Office action issued Feb. 3, 2011 in European Application No. 05810626.1, 4 pgs. (167EP1).
Office action issued Mar. 8, 2011 in Japanese Application No. 2007-536914, 12 pgs., and uncertified translation thereof. (170JP1).
Office action issued Mar. 9, 2011 in Chinese Application No. 201010167530.7, 5 pgs, and uncertified translation thereof. (170CN2).
Office action issued Jan. 11, 2011 in Japanese Application No. 2007-536905, 4 pgs., and uncertified translation thereof. (168JP1).
Machine Translation of Japanese Patent No. JPH09-102861, available May 5, 2011 from Patent Abstracts of Japan, http://www4.ipdl.inpit.go.jp/Tokujitu/tjsogodben.ipdl?N0000=115.
Machine Translation of Japanese Patent No. 2002-292935, available May 10, 2011 from Patent Abstracts of Japan, http://www4.ipdl.inpit.go.jp/Tokujitu/tjsogodben.ipdl?N0000=115.
Machine Translation of Japanese Patent No. 2002-171257, available May 10, 2011 from Patent Abstracts of Japan, http://www4.ipdl.inpit.go.jp/Tokujitu/tjsogodben.ipdl?N0000=115.

Machine Translation of Japanese Patent No. H09-058019, available May 10, 2011 from Patent Abstracts of Japan, http://www4.ipdl.inpit.go.jp/Tokujitu/tjsogodben.ipdl?N0000=115.

Machine Translation of Japanese Patent No. JP2004-276394, available May 10, 2011 from Patent Abstracts of Japan, http://www4.ipdl.inpit.go.jp/Tokujitu/tjsogodben.ipdl?N0000=115.

Machine Translation of Japanese Patent No. H06-113143, available May 10, 2011 from Patent Abstracts of Japan, http://www4.ipdl.inpit.go.jp/Tokujitu/tjsogodben.ipdl?N0000=115.

Machine Translation of Japanese Patent No. 09-231035, available May 10, 2011 from Patent Abstracts of Japan, http://www4.ipdl.inpit.go.jp/Tokujitu/tjsogodben.ipdl?N0000=115.

Machine Translation of Japanese Patent No. 2001-334706, available May 10, 2011 from Patent Abstracts of Japan, http://www4.ipdl.inpit.go.jp/Tokujitu/tjsogodben.ipdl?N0000=115.

Machine Translation of Japanese Patent No. 2003-001879, available May 10, 2011 from Patent Abstracts of Japan, http://www4.ipdl.inpit.go.jp/Tokujitu/tjsogodben.ipdl?N0000=115.

Office action issued Jul. 5, 2011 in Chinese Application No. 200580035215.6 and uncertified English translation, 7 pgs (167CN1).

Office action issued Aug. 2, 2011 in Korean Application No. 10-2007-7007157 and uncertified English translation, 5 pgs. (168KR1).

Office action issued Jun. 21, 2011 in Japanese Application No. 2007-538968 and uncertified English translation, 6 pgs (181JP1).

Office action issued Jul. 1, 2011 in Chinese Application No. 200580035221.1, 21 pgs. (168CN1).

Office action dated Jun. 21, 2011 issued in Japan application No. 2007-536879 and uncertified English translation, 5 pgs. (167JP1).

Machine Translation of Japanese Patent No. H11-58891, available Jun. 30, 2011 from Patent Abstracts of Japan.

Machine Translation of Japanese Patent No. 2004-268511, available Jun. 30, 2011 from Patent Abstracts of Japan.

Machine Translation of Japanese Patent No. 2000-6389, available Jun. 30, 2011 from Patent Abstracts of Japan.

* cited by examiner

TAILORING IMAGE DATA PACKETS TO PROPERTIES OF PRINT HEADS

BACKGROUND

This disclosure relates to systems, computer program products, and techniques for printing an image.

When an image such as a picture or a page of text is printed, image data is generally translated, by software, into a format understandable by a printing device (i.e., a printer) and relayed to a print buffer associated with the printing device. The print buffer receives the translated image data and stores at least a portion of the image data for subsequent printing by the printing device.

Many printing devices include multiple discrete print elements (e.g., nozzles for inkjet printers). The print elements can be deployed to print selected components of the image. For example, selected print elements can be deployed to print at selected locations on a workpiece. As another example, in color printing, selected print elements can be deployed to print selected colors. Image data from the print buffer can be used by control electronics to coordinate the printing of images by deployed print elements.

The print elements in a printing device can be arranged in groups called print modules (e.g., a physical group of inkjet nozzles). The print elements in a module can be grouped according to the deployment of the constituent elements. For example, print elements that print at a selected array of positions can be grouped in a print module. As another example, print elements that print a selected color (at a selected array of positions) can be grouped in a print module.

A single print head is typically formed of multiple print modules, each of which may have different properties. In addition, a print head in one printing system may differ from a print head in another system in terms of properties such as the number of inkjet nozzles per module and spacing between nozzles. To compensate for these differences, the software controlling the printing system needs to be tailored to accommodate the particular print head configuration.

SUMMARY

Described herein are methods and systems, including computer program products, that facilitate image printing. In one implementation, an image data packet configuration module in a control module of a printing system including one or more printing devices, e.g., print heads, queries a printing device in the system for information corresponding to properties of the printing device. The information can include specific configuration parameters for the printing device or an identifier associated with the printing device that the configuration module can use to look up the configuration parameters of the printing device. The configuration module may also receive information identifying the relationship between multiple printing devices.

The configuration module uses the identified configuration parameters to divide an image into image data packets, each data packet including one or more image portions. The configuration module may use table-driven processing routines to divide the image. The control module then transits the image data packets to the printing device for printing.

The configuration module may query the printing device by transmitting a control packet including a query over a control channel connecting the control module and the printing device. The control module may transmit the image data packets back to the printing device over an image data channel.

The described systems, computer program products, and techniques of generating image data packets can be implemented to realize one or more of the following advantages. The control software in the printing system can automatically configure itself based on information provided by the print head over a bi-directional control channel. This eliminates the need for manual coding to tailor the software for a particular print head configuration. The technique facilitates upgrades and replacements of individual print heads in print systems and portability between print systems.

The details of one or more implementations are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

Figure 1:
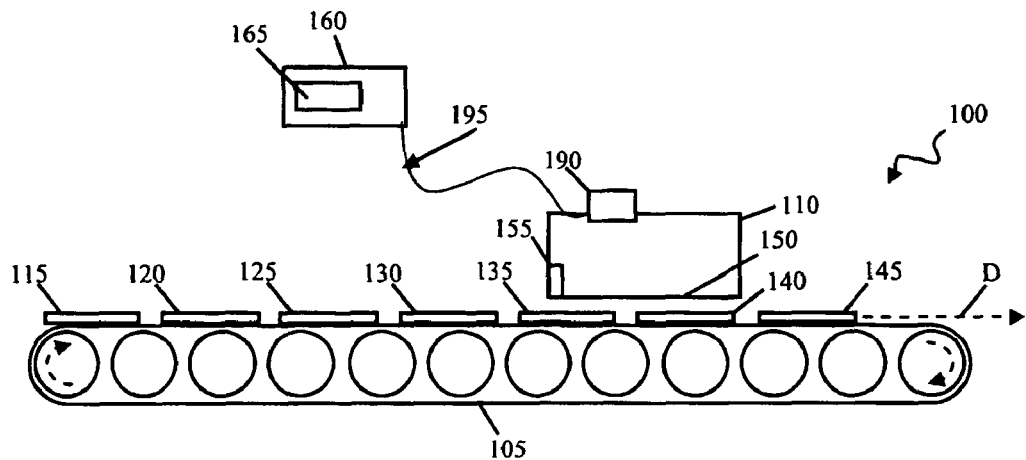
FIG. 1 is a block diagram of a print system.

FIG. 1 is a block diagram of a print system 100. Print system 100 includes a workpiece conveyor 105 and a printer housing 110, also referred to as a print head. Workpiece conveyor 105 produces relative motion between a series of workpieces 115, 120, 125, 130, 135, 140, 145 and print head 110. In particular, workpiece conveyor 105 conveys workpieces 115, 120, 125, 130, 135, 140, 145 in a direction D across a face 150 of print head 110. Workpiece conveyor 105 can include a stepper or continuous motor that moves a roller, a belt, or other element that can retain workpieces 115, 120, 125, 130, 135, 140, 145 during conveyance. Workpieces 115, 120, 125, 130, 135, 140, 145 can be any of a number of different substrates upon which system 100 is to print. For example, workpieces 115, 120, 125, 130, 135, 140, 145 can be paper, cardboard, microelectronic devices, or foodstuffs.

Print head 110 houses a workpiece detector 155. Workpiece detector 155 can detect the position of one or more workpieces 115, 120, 125, 130, 135, 140, 145. For example, workpiece detector 155 can be a laser/photodetector assembly that detects the passage of edges of workpieces 115, 120, 125, 130, 135, 140, 145 across a certain point on face 150.

Located remotely from the print head 110 are control electronics 160. The control electronics 160 interface with the print head 110 by a cable 195 (e.g., an optical cable) and minimal electronics 190. Control electronics 160 control the performance of print operations by system 100. Control electronics 160 can include one or more data processing devices that perform operations in accordance with the logic of a set of machine-readable instructions. Control electronics 160 may be, for example, a personal computing system that runs image processing software and software for controlling printing at the print head 110.

Located within the control electronics 160 is a print image buffer 165. Print image buffer 165 is one or more data storage devices that store image data for printing by print elements.

For example, print image buffer 165 can be a collection of random access memory (RAM) devices. Print image buffer 165 can be accessed by control electronics 160 to store and retrieve image data.

The control electronics 160 interface with the print head 110 via the cable 195 and minimal electronics 190. The control electronics 160 can send data across the cable 195, and the minimal electronics 190 can receive that data for printing at the print head 110. The control electronics 160 may have special circuitry (e.g., a data pump, as described in more detail in reference to FIG. 4) for generating data to send to the print head 110. The minimal electronics 190 may be, for example, a field-programmable gate array (FPGA) that includes a microprocessor, transceiver, and minimal memory. The minimal electronics 190 may be connected to the print head 110 such that the minimal electronics 190 can be disconnected easily should the print head 110 and/or hardware in the print head 110 be changed. For example, if the print head 110 is replaced with a newer print head containing newer printing modules, the minimal electronics 190 can be disconnected from the older print head 110 and connected to the newer print head.

The printing of an image is divided between the control electronics 160 and the minimal electronics 190 such that the control electronics performs image processing and controls printing, whereas the minimal electronics 190 receives data received via the cable 195 and uses that data to cause firing of print elements at the print head 110. Thus, for example, image data may be converted to jetmap image data, which may include dividing the image data into discrete units (e.g., image buffers, described in more detail below) as part of the process of converting to jetmap image data; delays may be inserted into image data (e.g., inserting delays corresponding to a deployment of print element associations); and image data may be sent (e.g., encoding data packets of image data and sending by a receiver) at an appropriate time by the control electronics 160; whereas, the minimal electronics 190 may merely receive the image data (e.g., decode image data packets sent across the cable 195) and relay the image data such that the image data is printed on a workpiece (e.g., cause firing of inkjet nozzles according to the image data). The control electronics 160 may synchronize printing of an image at the print head 110. Following the previous example, the control electronics 160 may synchronize the printing of an image by receiving an indication of a leading edge of a workpiece and sending image data across the cable 195 to cause the printing of an image at the print head 110.

The control electronics 160 can send image data to the print head 110 at high data rates to enable "just-in-time" printing of images on the workpieces as the workpieces move along the workpiece conveyor 105. In one implementation of just-in-time printing, transmission of image data to the print head 110 can serve as a trigger that causes the image data in a packet to be printed "substantially immediately" as the data arrives at the print head 110. In this implementation, the image data may not be stored on a storage component on the print head prior to printing the image data, but can be printed as the data arrives at the print head. Just-in-time printing may also refer to printing image data substantially at an instant at which the image data arrives at the print head.

In another implementation of just-in-time printing, data received at the print head is stored in one or more latches, and new or subsequent data that is being received at the print head can serve as a trigger to print the latched data. In this implementation, the data received at the print head is stored in a latch until the subsequent data arrives at the print head, and the subsequent data arriving at the print head can serve as a trigger to print the data that has been latched. The data, subsequent data, and latched data may be received and/or stored at the print head in the form of an image data packet. In one case, the subsequent data arriving at the print head is the next subsequent data. Alternatively, the subsequent data arriving at the print head is subsequent data other than the next subsequent data, such as subsequent data arriving after the next subsequent data. Because the image data is being printed at such a high-data rate, the data printed from latched data can also refer to data being printed "substantially immediately" as the data is arriving at the print head.

Because the print head 110 has minimal electronics 190 and a reduced amount of memory, the print head 110 may be implemented at a lower cost. The type of memory used on the print head 110 may also be implemented at a lower cost. In one implementation, the type of memory implemented on the print head 110 is part of a field-programmable gate array (FPGA) integrated circuit (IC) that may be part of the minimal electronics 190. The costs and engineering design efforts to implement the print head 110 may also be reduced due to little or no buffering of high speed image data at the print head 110. The system 100 may offer scalable transmission of high bandwidth, synchronous, just-in-time image data to the print head 110 in a number of configurations, including, for example, a configuration with multiple FGPAs at the print head 110, each of which may implement the minimal electronics 190 and interface with one or more data pumps using one or more cables.

Figure 2:
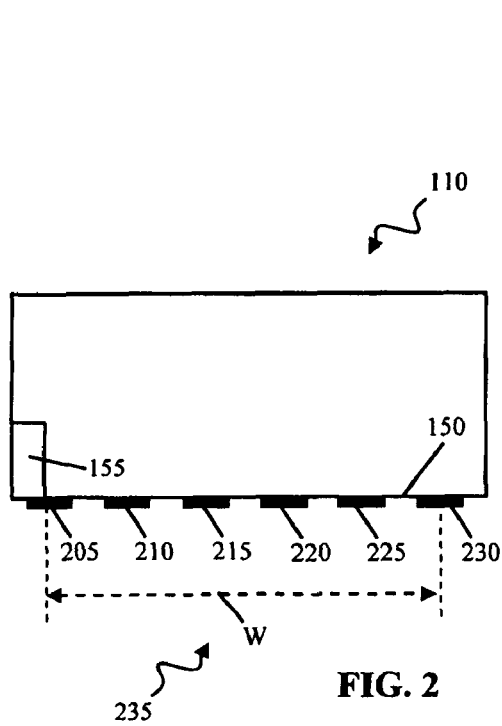
FIGS. 2 and 3 illustrate an arrangement of print modules and print elements in the print system of FIG. 1.
Figure 3:
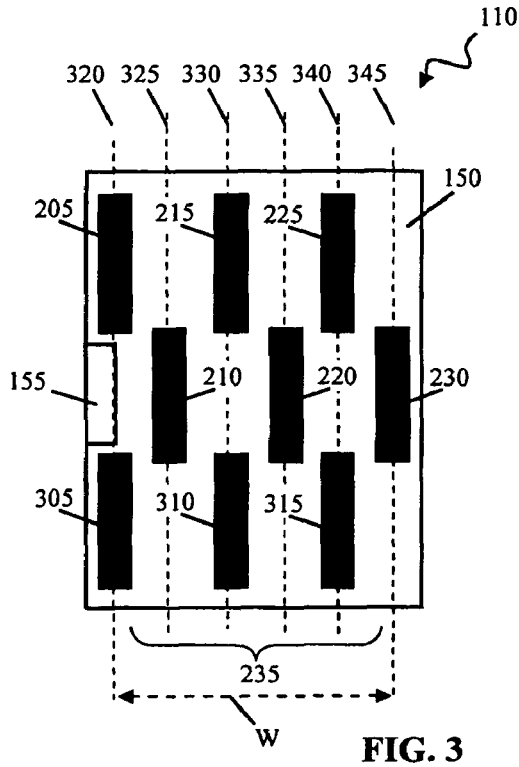

FIGS. 2 and 3 illustrate an arrangement of print modules and print elements on print head. In particular, FIG. 2 shows print head 110 from the side, whereas FIG. 3 shows print head 110 from below. Print head 110 includes a collection of print modules 205, 210, 215, 220, 225, 230, 305, 310, 315 on face 150. Print modules 205, 210, 215, 220, 225, 230, 305, 310, 315 each include one or more print elements. For example, print modules 205, 210, 215, 220, 225, 230, 305, 310, 315 can each include a linear array of inkjet nozzles.

In this particular print head configuration, print modules 205, 305 are arranged laterally along a column 320. Print module 210 is arranged along a column 325. Print modules 215, 310 are arranged laterally along a column 330. Print module 220 is arranged along a column 335. Print modules 225, 315 are arranged laterally along a column 340. Print module 230 is arranged along a column 345. This arrangement of print modules 205, 210, 215, 220, 225, 230, 305, 310, 315 along columns 320, 325, 330, 335, 340, 345 spans an effective print area 235 on face 150. Effective print area 235 has a longitudinal width W that spans from the print elements in print modules 205, 305 to the print elements in print module 230.

Print modules 205, 210, 215, 220, 225, 230, 305, 310, 315 can be deployed in print element associations to print selected components of an image. For example, print modules 205, 210, 305 can be deployed in a first print element association to print a first color across the entire lateral expanse of a substrate moving across face 150, print modules 215, 220, 310 can be deployed in a second print element association to print a second color across the entire lateral expanse, and print modules 225, 230, 315 can be deployed in a third print element association to print a third color across the entire lateral expanse.

As another example, the group of print modules 205, 210, 215, 220, 225, 230, 305, 310, 315 can be deployed in print element associations based on the columnar position of the constituent print elements in the modules. For example, a first print element association can include modules 205, 305 deployed so that their constituent print elements are arranged in a single column. A second print element association can include only print module 210. Modules 215, 310 can form a third association. Associations four, five, and six include modules 220, 225 and 315, and 230, respectively. Forming associations of print elements in this columnar manner allows the printing of back-to-back dissimilar images with variable but small or nonexistent non-printed area between finished image areas, relative to longitudinal width W, without need for complex real-time adjustments in image data.

As another example, the group of print modules 205, 210, 215, 220, 225, 230, 305, 310, 315 can be deployed in print element associations based on the lateral position of the constituent print elements in the modules. For example, a first print element association can include modules 205, 210, 305 deployed so that their constituent print elements are shifted in lateral position relative to the print elements in modules 215, 220, 310 and to the print elements in modules 225, 230, 315. A second print element association can include print modules 215, 220, 310 deployed so that their constituent print elements are shifted in lateral position relative to the print elements in modules 205, 210, 305 and to the print elements in modules 225, 230, 315. Modules 225, 230, 315 can form a third association. The relative shifts in position can be smaller than the lateral spacing of the print elements in the modules to, in net effect, decrease the lateral spacing between print elements on print head and thereby effectively increase the resolution at which an image can be printed.

Each print element association can have a dedicated memory location in print image buffer 165 (shown in FIG. 1) in that the association prints image data that once resided in the memory location. For example, when print image buffer 165 is a collection of queues of individual buffers, each print element association can have an individual, dedicated queue of buffers.

Figure 4:
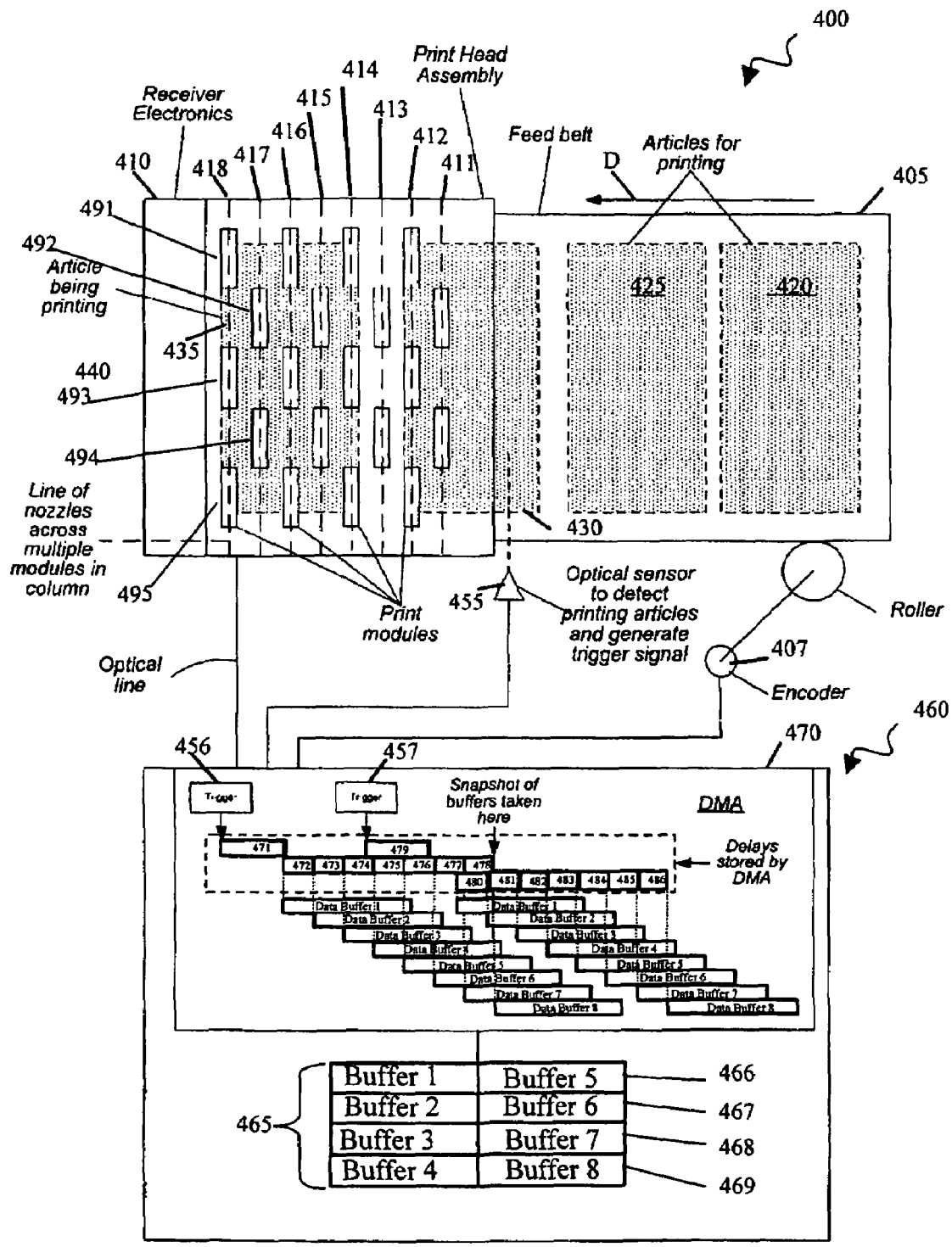
FIG. 4 shows a schematic representation of an implementation of a print system.

FIG. 4 shows a schematic representation of an implementation of a print system 400 according to an embodiment. System 400 includes workpiece conveyor 405, a print head 410, a workpiece detector 455, and control electronics 460.

Workpiece conveyor 405 conveys workpieces 420, 425, 430, 435 in a direction D across an effective print area 440 of print head 410. Workpiece conveyor 405 includes an encoder 407 that senses the speed of workpieces 420, 425, 430, 435. Encoder 407 also generates a signal that encodes the sensed speed and relays the signal to control electronics 460. Workpiece detector 455 is an optical sensor that detects the position of one or more workpieces 420, 425, 430, 435, and generates trigger signals (such as trigger signals 456 and 457) based upon that detection.

Print head 410 includes a collection of print modules arranged laterally along a series of columns 411, 412, 413, 414, 415, 416, 417, 418. This arrangement of print modules spans an effective print area 440. Each group of print modules deployed along each of columns 411, 412, 413, 414, 415, 416, 417, 418 constitutes a print element association. As examples, print modules 491, 493, 495 constitute a print element association along column 418, and print modules 492, 494 constitute a print element association along column 417.

Control electronics 460 controls the performance of print operations by system 400. Control electronics 460 includes a collection of print image buffers 465. Control electronics 460 can access the print image buffers in collection 465 to store and retrieve image data. In the configuration shown in FIG. 4, there are eight print image buffers in collection 465, and each print image buffer is dedicated to a print element association arranged along one of columns 411, 412, 413, 414, 415, 416, 417, 418. For example, print image buffers 466, 467, 468, 469 may correspond to the print element associations arranged along columns 415, 416, 417, 418, respectively. In particular, each print element association prints image data only from the associated print image buffer.

Control electronics 460 also includes a data pump 470. A "data pump" refers to a functional component, e.g., implemented in hardware, software, programmable logic or a combination thereof, that processes data and transmits it to one or more printing devices for printing. In one implementation, the data pump can refer to a direct memory access (DMA) device. The data pump 470 is positioned along the data communication path between the print element associations and their dedicated print image buffers in collection 465. The data pump 470 can receive and store image data from each print image buffer in collection 465. The data pump 470 is programmable by control electronics 460 to delay the communication of information from the print image buffers in collection 465 to the print element associations.

In operation, control electronics 460 can divide image data according to the deployment of print element associations in effective print area 440. Control electronics 460 can also allocate the divided image data to an appropriate print image buffer in collection 465.

As workpiece 435 is conveyed by workpiece conveyor 405 to enter effective print area 440, workpiece detector 455 detects the leading edge of workpiece 435 and generates trigger signal 456. Based on receipt of trigger signal 456, control electronics 460 can program data pumps 470 with positional delays 471, 472, 473, 474, 475, 476, 477, 478. Delay 471 delays the communication of image data from a first print image buffer in collection 465 to the print element association arranged along column 411. Delay 472 delays the communication of image data from a second print image buffer in collection 465 to the print element association arranged along column 412. Delays 473, 474, 475, 476, 477, 478 delay the communication of image data from respective print image buffers in collection 465 to the print element associations arranged along columns 413, 414, 415, 416, 417, 418.

As workpiece 435 is conveyed by workpiece conveyor 405 across effective print area 440, the print element associations arranged along columns 411, 412, 413, 414, 415, 416, 417, 418 successively print. In particular, as workpiece 435 is advanced one scan line across effective print area 440, the data pump 470 dumps image data to the appropriate receiver electronics at the print element associations arranged along columns 411, 412, 413, 414, 415, 416, 417, 418 (i.e., the data pump 470 causes the image data to be transmitted to the printing device). The dumped image data identifies print elements that are to fire for the instantaneous position of workpiece 435 in effective print area 440. The identification of print elements may be implicit, e.g., an ordering of image data in an image data packet in a format corresponding to an order of print elements and/or print element associations at a printing device. Data for successive firings can be loaded from print image buffers in collection 465 to the data pump 470 during firings.

While workpiece 435 is still being printed, workpiece 430 can be conveyed by workpiece conveyor 405 to enter effective print area 440. Workpiece detector 455 detects the leading edge of workpiece 430 and generates trigger signal 457. Based on receipt of trigger signal 457, control electronics 460 may cause the data pump 470 to insert delays 479, 480, 481, 482, 483, 484, 485, 486. Delay 479 delays the communication of image data from a first print image buffer in collection 465 to the print element association arranged along column 411. Delay 480 delays the communication of image data from a second print image buffer in collection 465 to the print element association arranged along column 412. Delays 481, 482, 483, 484, 485, 486 delay the communication of image data from respective print image buffers in collection 465 to the print element associations arranged along columns 413, 414, 415, 416, 417, 418. Alternatively, delays may already be inserted into image data and the trigger signal may cause the sending of image data by the data pump 470.

As workpiece 430 is conveyed by workpiece conveyor 405 into effective print area 440, the print element associations arranged along columns 411, 412, 413, 414, 415, 416, 417, 418 print upon workpieces 430, 425. In particular, as workpieces 435, 430 are advanced one scan line, the data pump 470 dumps image data to the appropriate receiver electronics for the print element and workpieces 435, 430 are printed at the same time.

Figure 5:
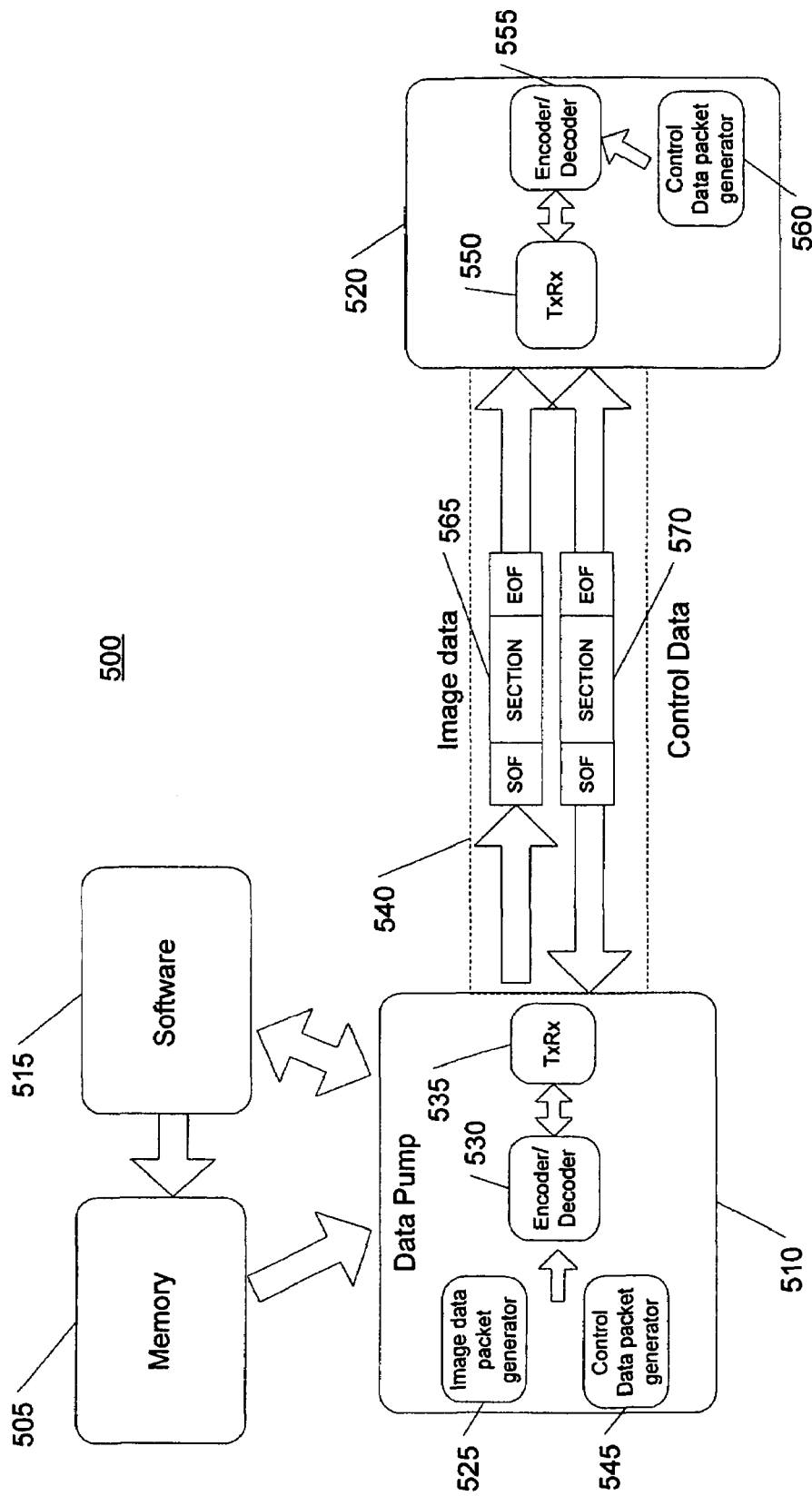
FIG. 5 is a block diagram of a system for transmitting image and control data between devices according to an embodiment.

Data (e.g., image data defining a print scan line) may be transmitted between the control electronics 460 and the print head 410 in accordance with a packet-based protocol. FIG. 5 is diagram of a system 500 for transmitting data according to such a protocol. The system 500 includes a memory 505, a data pump 510, software 515, and a printing device 520, e.g., a single print head. The memory 505, data pump 510, and software 515 may be contained in an ordinary personal computer (PC). The memory 505 may be DMA-accessible memory available via a Peripheral Component Interconnect (PCI) bus, PCI-X (Peripheral Component Interconnect Extended) bus, PCI Express bus, or other suitable bus. The memory is used to store image data for processing by the data pump 510.

The software 515 can control transmission of image data and can send image data to the memory 505. The data pump 510 can use image data to generate an image data packet (also referred to as an "image scan line packet") at an image data packet generator 525. Generating an image data packet may include serializing the image data packet at the image data packet generator 525. In addition to sending image data to the memory 505, the software 515 can send control data to the data pump 510. Control data may include any type of data that can be used to control the printing device 520. A control data packet can be generated from control data at the control data packet generator 545.

Image data packets, such as the image data packet 565, may include a start of frame, a data section, and an end of frame. The data section includes image data that can be used at a printing device for printing. The protocol that defines the frame format for the image data packet may define that an image data packet should include one or more scan lines of image data and a certain start of frame and end of frame. For example, the protocol may define an image data packet to include a 32-bit start of frame, 3,552 bits of bitmap image data as the data section representing one or more scan lines, and a 32-bit end of frame.

Portions of a scan line in an image data packet may correspond to a print element association at a printing device. As an example, if a printing device includes eight print element associations, an image data packet framed for that printing device might include image data representing eight portions of a scan line, one portion for each print element association. An image data packet need not be limited to including data from a single image. For example, the protocol may define that an image data packet should include a portion of an image for each print element association, where each portion is sufficient to cause a print element association to print once (e.g., if the print elements are inkjet printing nozzles, this would be a single firing of inkjet nozzles, also referred to as a single impression). In that example, a image data packet may include image data portions from two images, in a system with eight print element associations, if a first four portions of image data correspond to a first image and a second four portions of image data correspond to a second image. If a single image data packet can include image data from two different images, the image data packet may advantageously allow the printing of two images (alike or similar) on two different workpieces. Similarly, an image data packet may contain image information from several different images, allowing printing of these images simultaneously by corresponding print element associations. In alternative implementations, a image data packet need not represent one or more scan lines, rather a image data packet may be defined to include other divisions (i.e., portions) of image data that correspond to print element associations. For example, if each print element association prints a certain color, image data may be divided and included in a image data packet such that the portions of image data may correspond to different colors that need to be printed by different print element associations.

Control data packets, such as the control data packet 570, may include a start of frame, a data section, and an end of frame. The data section represents control information. For example, the data section may include a command from the data pump-side to the printer-side of the diagram, or status information from the printer-side to the data pump-side of the diagram. Commands may include a query for a temperature of a printing module, a command to increase or decrease a temperature of a printing module, a command to change the spacing or print elements, and the like. Status information may include, for example, a temperature of a print module, a spacing of print elements, a number of print elements, and the like.

The transmitting and receiving of data packets may logically include two data channels, where a first data channel is a unidirectional image data channel from the data pump 510 to the printing device 520, and a second channel is a bi-directional control data channel. Data packets may be interleaved, such that control data packets are sent from the data pump 510 to the printing device 520 when image data packets are not being sent. For example, control data packets may be sent immediately after image data packets when there is enough bandwidth to support the sending of a control data packet without interfering with the transmission of image data packets. As another example, certain times in printing an image, for example between images or print jobs, may be a period of time that is used for transmission of control data packets. Because there may be bi-directional serial communication that includes a transmitting line and a receiving line, control data packets may be sent from the printing device 520 to the data pump 510 while image data packets are sent to the printing device 520. A definition of two logical channels for transmitting data, and various aspects of those channels, may be included in one of the protocols described earlier, for transmitting data.

Image data packets and control data packets are encoded at the encoder/decoder 530. The encoder/decoder 530 may encode data according to the 8B/10B-encoding scheme. Encoded image data packets are transmitted by the transceiver 535. The transceiver 535 is operative to transmit and receive image data packets across a transmission line 540 that is connected to the printing device 520.

At the printing device 520, control electronics, such as control electronics embedded in an FPGA, are operative to transmit and/or receive image data packets at the transceiver 550. Image data packets may be encoded and/or decoded at the encoder/decoder 555 according to the 8B/10B-encoding scheme. In alternative implementations, a technique other than 8B/10B-encoding may be used to ensure DC balance through the physical communication interface. Some alternative implementations (notably those over short distances) may not require DC balance in the transmission medium, and may use non-balanced encoding techniques. Control packets can be generated at a control packet generator 560. These control packets may include, for example, status information, such as the temperature of a printing module. Control packets may be generated at the printer-side in response to a control packet that was sent from the data pump-side.

A single print head may include multiple print modules, each of which may have different properties. These properties may include, for example, the number of inkjet nozzles in a print module, spacing between nozzles, and orientation of the nozzles and/or modules. In addition, a print head in one printing system may differ from a print head in another system based on the customer's end application (e.g., printing newspapers or printing on food items, e.g., candies). To compensate for these differences, the software controlling the printing system needs to be tailored to the particular print head configuration.

In an embodiment, control software in the control electronics 160 may detect the properties of the print head(s) in the printing system. For example, the control software may use the control communications channel to interrogate a print head and determine its configuration. This information can then be used to generate image data packets automatically, rather than requiring manual coding to configure the software to accommodate the particular print head configuration.

Figure 6A:
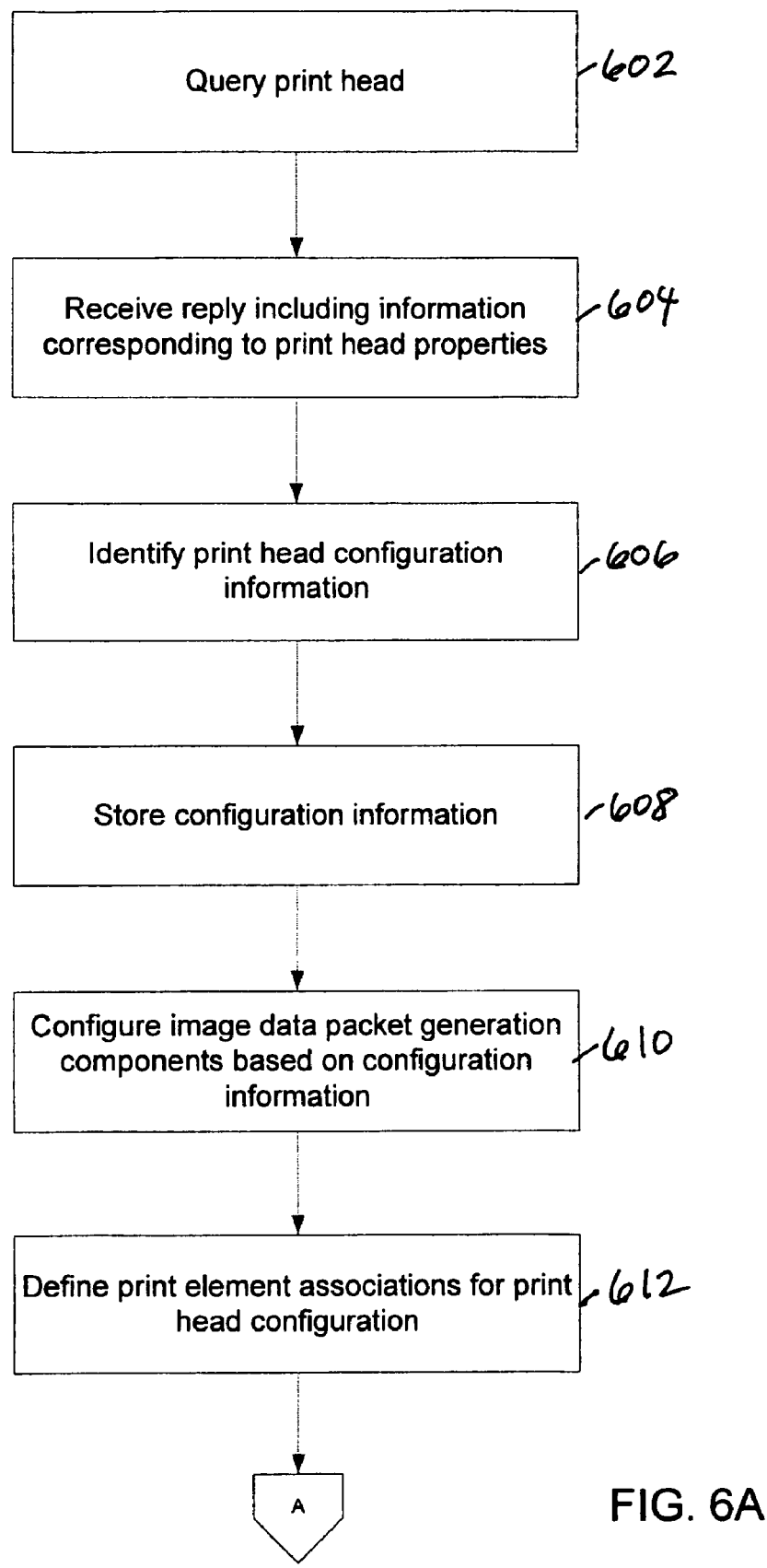
FIGS. 6A and 6B include a flowchart describing an image data packet generation process according to an embodiment.
Figure 6B:
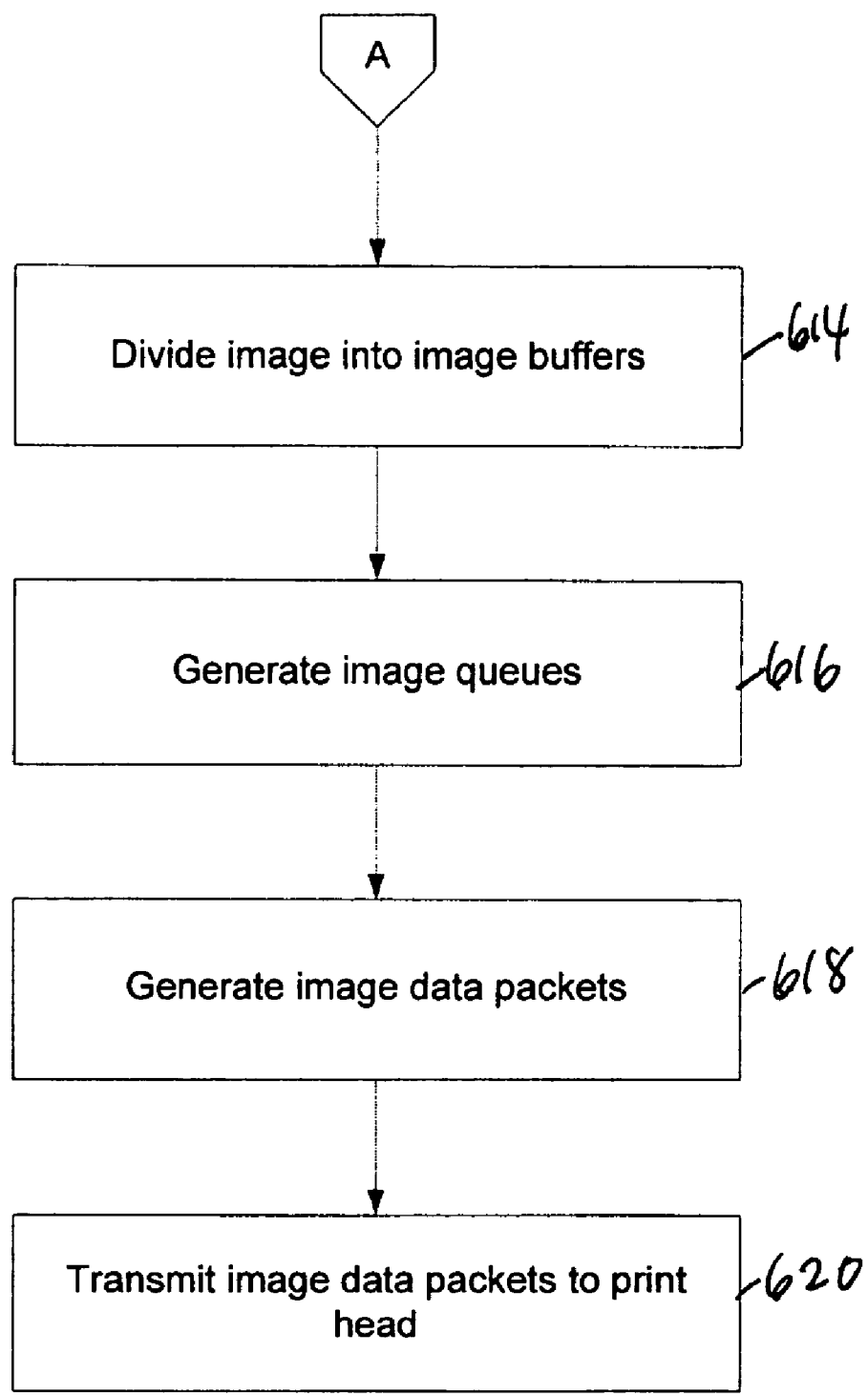

FIGS. 6A and 6B include a flowchart describing an image data packet generation process according to an embodiment. The printing system may include multiple print heads, each of which can have different numbers, arrangements, and/or types of print modules. During start-up of the printing system or installation of new print head(s) in the printing system, the control software may query a print head at 602. The query may be sent in a control packet over the communication channel.

The print head may reply by sending a control packet to the control software. The control packet may include information corresponding to properties of the print head which is stored in memory at the print head (e.g., a ROM or flash memory). The information may be specific configuration information including physical attributes of the print head, such as the size of the print modules, quantity, and layout in the print head. The definition may also identify the ordering of print elements and/or modules at a print head, spacing of print elements and/or modules, and a native resolution of the print head.

Alternatively, the information corresponding to properties of the print head may be more general, such as a part number or configuration type indicator that corresponds to known information at the control center, e.g., configuration information entries in a table stored at the control software.

The control software receives the reply control packet at 604 and uses the information in the packet to identify the print head configuration at 606, e.g., by performing a table lookup. The control software may store the configuration information at 608. This stored information may be updated in response to, e.g., a start-up or reset condition.

The information from the individual print heads provides one level of configuration information, and is used as the final translation level. Higher levels of configuration information may be provided from other sources. For example, in a system with multiple print heads, one or more of which may be associated with the same data pump, an application can provide system-level configuration information that identifies the physical relationship of multiple print heads. The application may also provide configuration information including dynamic parameters for printing, such as print resolution, gray scale (i.e., number of bits used for each pixel), print direction (e.g., for scanning a print head laterally), and head orientation (e.g., if a print head assembly is rotated 180 degrees).

The control software uses the configuration information to configure the components responsible for generating the image data packets, e.g., software 515, image data packet generator 525, and encoder/decoder 530 in FIG. 5, to generate image data packets appropriate for the particular print head configuration at 610. That is, the control software configures the image data generation components to generate image data packets that will cause the print elements in the print head to faithfully print corresponding portions of scan lines in the desired image. The configuration operation may include defining print element associations appropriate for the particular layout of print elements and print modules in the print head at 612. The software then divides the image based on the print element associations at 614 and generates image queues based on the print element associations at 616.

Dividing images and generating image queues may involve generating a buffer of image data for each print module in a print element association, combining buffers associated with a same print element association, and generating image queues that include combined buffers associated with an image queue. For example, in FIG. 4, twenty print modules are at the print head. An image may be divided such that each buffer has image data corresponding to a print module. Then, buffers corresponding to print modules in a same print element association, such as the print modules 491, 493, 495 in a print element association including the print modules in column 418, may be combined such that a combined buffer is associated with a print element association (e.g., a buffer associated with all of the print elements along column 418). Then, combined buffers associated with a same print element association may be put in an image queue, such that image queues are generated and each image queue has combined buffers corresponding to a same print element association.

The software may use a table driven approach to divide an image and fill the image queues. The software may generate a table using the configuration information. The table can include bit patterns and shift patterns that can be used when extracting data in accordance with the layout of print elements at a print head. Generic processing routines can then be used in conjunction with the table to generate a set of buffers of image data, where each buffer corresponds to a print element association at the print head. The processing routines use both the discovered information and the higher level configuration information received from the application to perform the processing. Then, the image queues may be filled with buffers of image data that correspond to the print element associations, such that buffers of image data that correspond to a same print element association are queued in the same image queue (e.g., all buffers corresponding to a first print element association may be in a first image queue, all buffers corresponding to a second print element association may be in a second image queue, and so on). The image queues may be filled efficiently via parallel processing, which may manipulate bytes of an image in parallel. By using a table driven approach, highly optimized queue generation routines (e.g., routines including the generic routines described above) can be used across different types of print heads, including families of products, with little or no modification to the optimized routines.

The data pump may retrieve image buffers generated by the software from memory, and the image data packet generator may use the retrieved image buffers to generate image data packets at 618. The image data packets are then encoded and transmitted to the print head at 620.

As described above, the configuration information stored at the control software may be updated in response to a start-up or reset condition. The control software may query the connected print head(s) in response to the occurrence of such a condition, and if any changes have been made, update the configuration information. This facilitates upgrades and replacements of individual print heads in print systems and portability of the control software between print systems.

The disclosed subject matter and all of the functional operations described herein can be implemented in digital electronic circuitry, or in computer software, firmware, or hardware, including the structural means disclosed in this specification and structural equivalents thereof, or in combinations of them. The disclosed subject matter can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, subroutine, or other unit suitable for use in a computing environment.

The processes and logic flows described herein, including the method steps of the disclosed subject matter, can be performed by one or more programmable processors executing one or more computer programs to perform functions of the disclosed subject matter by operating on input data and generating output. The processes and logic flows can also be performed by, and apparatus of the disclosed subject matter can be implemented as, special purpose logic circuitry, e.g., an FPGA or an ASIC (application-specific integrated circuit).

A number of implementations have been described. Nevertheless, it will be understood that various modifications may be made. For example, although the processes described in reference to the flowchart in FIGS. 6A and 6B are composed of a certain number and kind of processes, alternative implementations may include additional and/or different processes. Accordingly, other implementations are within the scope of the following claims.

What is claimed is:

1. A computer-implemented method comprising:
    sending to a printing device a request for specific configuration information characterizing physical properties of the printing device;
    receiving, from the printing device, the specific configuration information responsive to the request and characterizing the physical properties of the printing device;
    identifying configuration parameters of the printing device based on the received specific configuration information;
    dividing an image into image portions based on the configuration parameters;
    generating a plurality of image data packets, each image data packet including one or more image portions; and
    transmitting the image data packets to the printing device.

2. The method of claim 1, wherein:
    sending the request comprises sending a first control data packet over a control data channel; and
    receiving the specific configuration information characterizing the physical properties of the printing device comprises receiving a second control data packet over the control data channel.

3. The method of claim 1, wherein said transmitting the image data packets comprises transmitting the image data packets over an image data channel.

4. The method of claim 1, wherein the configuration parameters comprise a first parameter characterizing layout of a print head of the printing device.

5. The method of claim 1, further comprising generating a table based on the configuration parameters, and
    wherein said dividing the image comprises dividing the image using said table.

6. The method of claim 1, further comprising:
    using the configuration parameters to generate print element associations, and
    wherein dividing comprises dividing the image into image portions based on the print element associations.

7. The method of claim 1, wherein the specific configuration information comprises information identifying ordering or spacing of print elements in a print head of the printing device.

8. The method of claim 1, further comprising:
    receiving information characterizing a relationship between one or more print heads, and
    wherein dividing the image comprises dividing the image into image portions based on the characterized relationship between the one or more print heads.

9. A computer program product, tangibly embodied in a machine readable information storage device, comprising machine readable instructions operable to cause a printing system to perform operations, the operations comprising:
    send, to a printing device, a request for specific configuration information characterizing properties of the printing device;
    receive, from the printing device, the specific configuration information responsive to the request and characterizing the physical properties of the printing device;
    identify configuration parameters of the printing device based on the received specific configuration information;
    divide an image into image portions based on the configuration parameters;
    generate a plurality of image data packets, each image data packet including one or more image portions; and
    transmit the image data packets to the printing device.

10. The product of claim 9, wherein:
    the instructions operative to cause the system to send the request comprise instructions operative to cause the system to send a first control data packet over a control data channel; and
    the instructions operative to cause the system to receive the specific configuration information characterizing the physical properties of the printing device comprise the instructions operative to cause the system to receive a second control data packet over the control data channel.

11. The product of claim 9, wherein the instructions operative to cause the system to transmit the image data packets comprise the instructions operative to cause the system to transmit the image data packets over an image data channel.

12. The product of claim 9, wherein the configuration parameters comprise a first parameter characterizing layout of a print head of the printing device.

13. The product of claim 9, further comprising instructions to cause the system to perform operations comprising:
    generate a table based on the configuration parameters, and wherein the instructions operative to cause the system to divide the image comprise the instructions operative to cause the system to divide the image using said table.

14. The product of claim 9, further comprising instruction to cause the system to perform operations comprising:
use the configuration parameters to generate print element associations, and
wherein the instructions operative to cause the system to divide comprise the instructions operative to cause the system to divide the image into image portions based on the print element associations.

15. The product of claim 9, wherein the specific configuration information comprises information identifying ordering or spacing of print elements in a print head of the printing device.

16. The product of claim 9, further comprising the instructions operative to cause the system to perform operations comprising:
receive information characterizing a relationship between one or more print heads, and
wherein the instructions operative to cause the system to divide the image comprises divide the image into image portions based on the characterized relationship between the one or more print heads.

17. A printing system comprising:
means for sending to a printing device a request for specific configuration information characterizing physical properties of the printing device;
means for receiving, from the printing device, the specific configuration information responsive to the request and characterizing the physical properties of the printing device;
means for identifying configuration parameters of the printing device based on the received specific configuration information;
means for dividing an image into image portions based on the configuration parameters;
means for generating a plurality of image data packets, each image data packet including one or more image portions; and
means for transmitting the image data packets to the printing device.

18. The system of claim 17, further comprising:
means for sending the request comprises sending a first control data packet over a control data channel; and
means for receiving a second control data packet over the control data channel, the second control data packet including the specific configuration information.

19. The system of claim 17, further comprising:
means for transmitting the image data packets over an image data channel.

20. The system of claim 17, wherein the configuration parameters comprise a first parameter characterizing layout of a print head of the printing device.

21. The system of claim 17, further comprising:
means for generating a table based on the configuration parameters, and
wherein said dividing the image comprises dividing the image using said table.

22. The system of claim 17, further comprising:
means for using the configuration parameters to generate print element associations; and
means for dividing the image into image portions based on the print element associations.

23. The system of claim 17, wherein the specific configuration information comprises information identifying ordering or spacing of print elements in a print head of the printing device.

24. The system of claim 17, further comprising:
means for receiving information characterizing a relationship between one or more print heads; and
means for dividing the image into image portions based on the characterized relationship between the one or more print heads.

25. A system comprising:
a printing device comprising
a print head comprising a collection of print modules, and
a memory storing information characterizing a physical property of the print head;
control electronics comprising logic for dividing image data into portions based on the information characterizing the physical property of the print head stored at the memory of the printing device; and
a data communication path between the printing device and the control electronics,
wherein the control electronics are located remotely from the printing device.

26. The system of claim 25, wherein the printing device and the control electronics each comprise packetized data communication devices configured to communicate packetized data, including data characterizing the physical property of the print head, over the data communication path.

27. The system of claim 25, wherein the control electronics further comprise a collection of image data buffers to store divided image data for communication to the printing device along the data communication path.

28. The system of claim 25, wherein the information characterizing the physical property of the print head comprises information characterizing an ordering of the modules at the print head.

29. The system of claim 25, wherein the information characterizing the physical property of the print head comprises information characterizing a spacing of the modules at the print head.

30. The system of claim 25, wherein the information characterizing the physical property of the print head comprises information characterizing a native resolution of the print head.

* * * * *

UNITED STATES PATENT AND TRADEMARK OFFICE
CERTIFICATE OF CORRECTION

| | | |
|---|---|---|
| PATENT NO. | : 8,199,342 B2 | Page 1 of 1 |
| APPLICATION NO. | : 10/977298 | |
| DATED | : June 12, 2012 | |
| INVENTOR(S) | : Robert Martin | |

It is certified that error appears in the above-identified patent and that said Letters Patent is hereby corrected as shown below:

Claim 9, Column 12, Line 31 – delete "machine readable" and insert -- machine-readable --, therefor.

Claim 9, Column 12, Line 31 – before "storage" delete "information".

Claim 9, Column 12, Line 35 – after "characterizing" insert -- physical --.

Claim 10, Column 12, Line 55 – delete "the-" and insert -- the --, therefor.

Signed and Sealed this
Seventh Day of August, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,199,342 B2 | Page 1 of 1 |
| APPLICATION NO. | : 10/977298 | |
| DATED | : June 12, 2012 | |
| INVENTOR(S) | : Martin | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1085 days.

Signed and Sealed this

Twenty-seventh Day of November, 2012

David J. Kappos
*Director of the United States Patent and Trademark Office*